ical Patent [19]

[11] Patent Number: 4,939,776
[45] Date of Patent: Jul. 3, 1990

[54] LOGIC SIGNAL CIRCUIT FOR A RELEASING RELAY

[75] Inventor: Bruce D. Bender, Phoenix, Ariz.

[73] Assignee: Siemens Transmission Systems, Inc., Phoenix, Ariz.

[21] Appl. No.: 247,055

[22] Filed: Sep. 20, 1988

[51] Int. Cl.⁵ .......................................... H04M 3/00
[52] U.S. Cl. .................................. 379/382; 361/152; 361/159
[58] Field of Search .................... 361/2, 13, 159, 111, 361/117, 118, 152; 379/382, 399, 412, 413

[56] References Cited

U.S. PATENT DOCUMENTS

| | | | |
|---|---|---|---|
| 3,558,910 | 1/1971 | Dale et al. | 307/134 |
| 3,560,796 | 2/1971 | Landis | 361/6 |
| 4,146,752 | 3/1979 | Koenig | 379/301 |
| 4,300,024 | 11/1981 | Wever et al. | 379/1 |
| 4,438,472 | 3/1984 | Woodworth | 361/13 |
| 4,572,927 | 2/1986 | Huft | 379/412 |
| 4,733,326 | 3/1988 | Harsch et al | 361/159 |
| 4,774,624 | 9/1988 | Qualich | 361/159 |

Primary Examiner—A. D. Pellinen
Assistant Examiner—Jeffrey A. Gaffin
Attorney, Agent, or Firm—Jeffrey P. Morris

[57] ABSTRACT

A circuit and method which eliminates the voltage spike generated by inductive kick, and generates a signal which is active while a relay is being released and for a given period thereafter. This signal can be used to power down circuits supplying signals to relay contacts, thereby allowing the relay to release without current or voltage potentials at its contact, e.g. dry switching. The generated signal may also be used to disable sensors which might give false indications while the relay contacts are switching. In telephone line circuits, the generated signal can be used to disable the telephone hook switch detector or to power down the battery feed circuit feeding the subscriber line. The relay coil energy generates a signal which is active while the relay is being released. The invention uses a minimum number of components and the circuit is adjustable as to how long the generated signal remains active after the relay is released.

11 Claims, 3 Drawing Sheets

LOGIC SIGNAL CIRCUIT FOR A RELEASING RELAY

BACKGROUND OF THE INVENTION

1. Field of the Invention

The present relates generally to circuitry for generating a signal which is active when a relay is being released, for eliminating noise caused by the operation of relay contacts and thereby reducing or eliminating the susceptibility of electronic circuitry to such noise. Such a generated signal may be used in powering down the signal source to the relay contacts, e.g. dry relay switching, or for masking data collection while a relay is releasing. Specific applications are telephone line circuits, data acquisition and transmission systems and electronic circuitry generally which can be adversely affected by the interference caused by relay releasing noise.

2. Description of the Prior Art

It is known in the prior art that when relay contacts are used to break current flow or to connect unequal voltage potentials, arcing and showering may occur. Some types of relay contacts bounce when being connected, which prolongs and exacerbates the aforementioned condition. As a result, high frequency disturbances permeate through nearby circuitry via metallic connections, capacitive coupling and electromagnetic radiation. These disturbances can cause noise and data errors in such nearby electronic circuitry.

Telephone subscriber line circuits, for example, often use relays for disconnecting the battery feed circuit and for switching ringing voltage onto the subscriber line. When ringing is removed from the line, one set of relay contacts must break the current path of the ringing voltage while another must remake the current path to the battery feed circuit. Both of these actions can cause spurious tripping of sensors and noise impulses in nearby circuits.

Capacitors are commonly employed around relay contacts to suppress electrical disturbances. The size and effectiveness of these capacitors is often limited due to the need for high frequency as well as high voltage isolation.

U.S. Pat. No. 3,558,910 describes a known relay circuit employing a triac to prevent arcing. U.S. Pat. No. 4,146,752 describes a bounce free contact operation using a transistor which is rendered increasingly current conductive in accordance with a charging process setting. U.S. Pat. No. 4,300,024 describes a measurement circuit which overcomes the effects of relay contact bounce. U.S. Pat. No. 4,438,472 describes a dc arc suppression circuit which prevents contact bounce on closure of contacts by providing a diode in parallel with a portion of the circuit. U.S. Pat. No. 3,560,796 describes a relay control circuit which ensures that relay contact bounce occurs during a portion of the applied ac current source so as to eliminate contact erosion.

SUMMARY OF THE INVENTION

The present invention provides a simple circuit and method which not only eliminates the voltage spike generated by inductive kick, but also generates a signal which is active while a relay is being released and for a given period thereafter. This signal can be used to power down circuits supplying signals to relay contacts, thereby allowing the relay to release without current or voltage potentials at its contacts, e.g. dry switching. The generated signal may also be used to disable sensors which might give false indications while the relay contacts are switching. In telephone line circuits, the generated signal can be used to disable the telephone hook switch detector or to power down the battery feed circuit feeding the subscriber line.

Essentially, the present invention uses the relay coil energy to generate a signal which is active while the relay is being released. The invention uses a minimum number of components and is adjustable as to how long the generated signal remains active after the relay is released.

The objects and advantages of the invention are described with reference to the accompanying figures and description of the preferred embodiments, wherein:

DESCRIPTION OF THE PREFERRED EMBODIMENT

Figure 1:
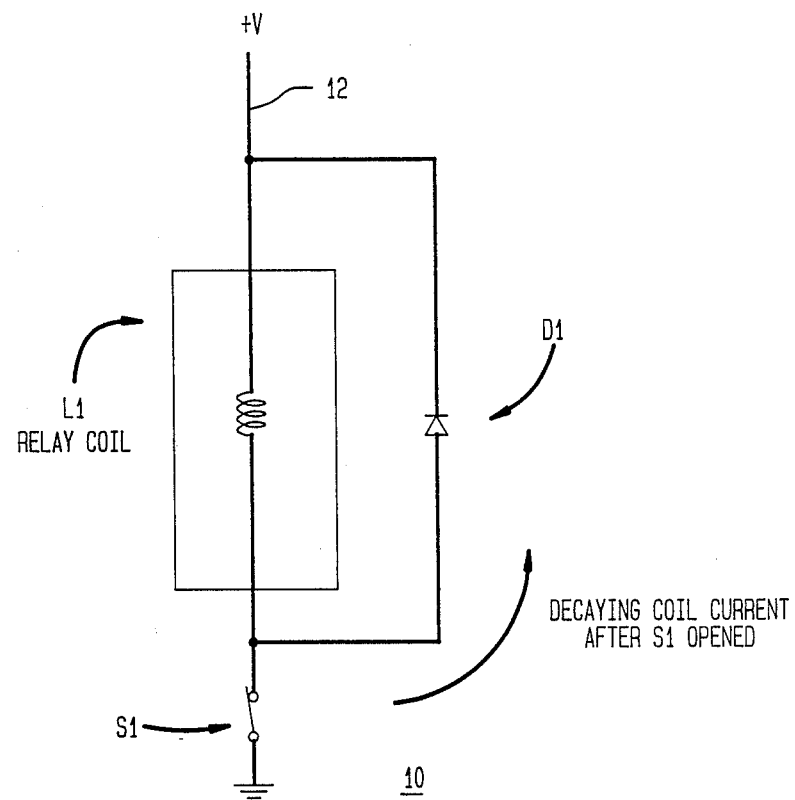
FIG. 1 illustrates a prior art technique for deenergizing an inductor and avoiding an inductive current surge.

A known prior art technique for dissipating the magnetic energy from a relay coil is illustrated by FIG. 1, generally at 10. When a relay is activated, its coil L1 stores energy in a magnetic field. When the switch 31 is opened, the coil L1 must be deenergized. A diode D1 is placed in parallel with the relay coil L1 to deenergize the coil L1 and thereby avoid the large inductive voltage surge or "inductive kick". When the switch S1 is opened, a decaying coil current flows through the diode D1 until the magnetic energy is dissipated.

Figure 2:
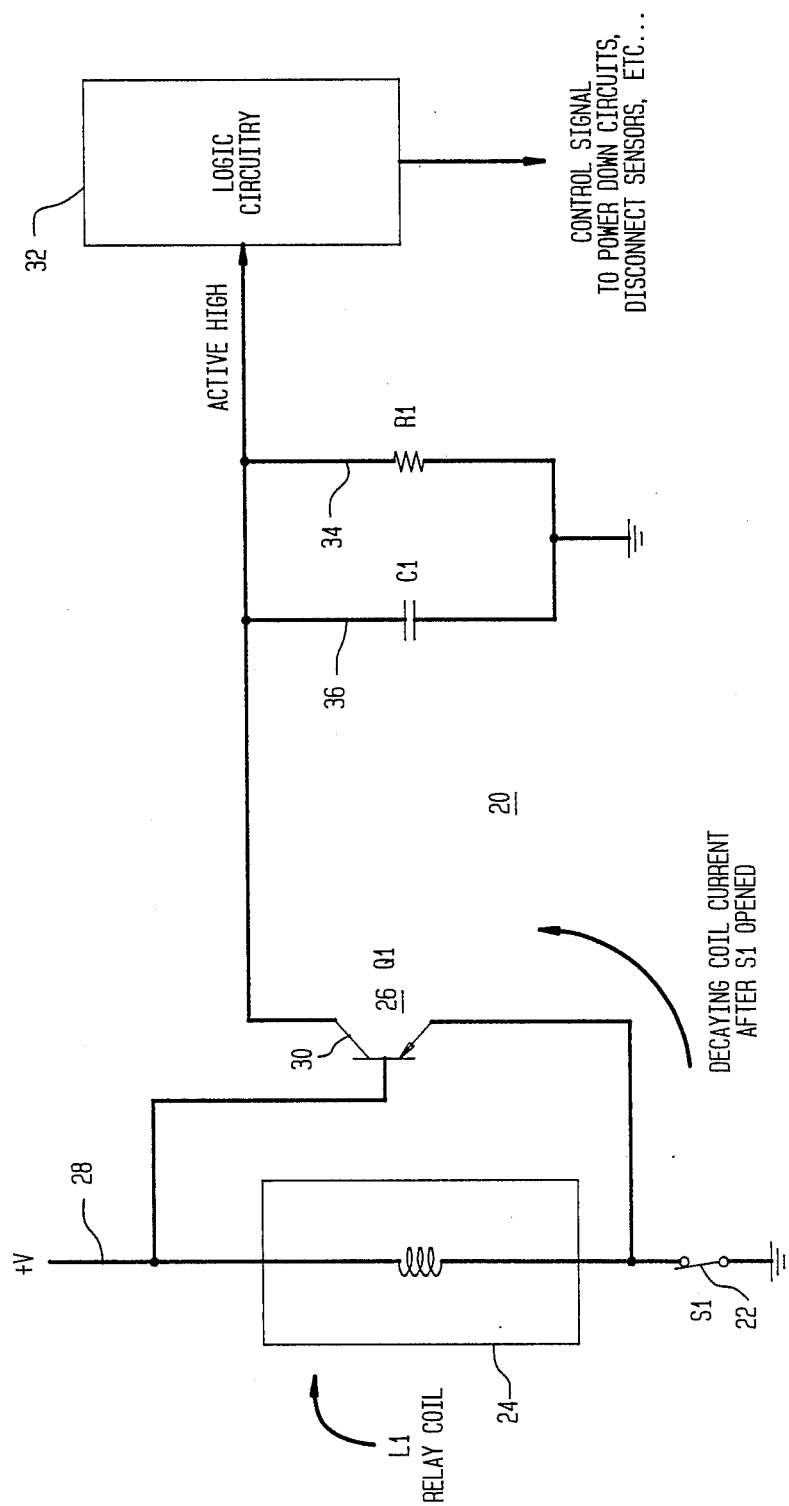
FIG. 2 is a preferred embodiment of a circuit implementing the present invention.

Referring now to FIG. 2, an embodiment of the present invention is illustrated generally at 20. When the switch S1 at 22 is opened, the coil energy from relay coil L1 at 24 is dissipated through a transistor, shown as a PNP transistor Q1 at 26, instead of through a diode as had been done previously in the prior art, as described by FIG. 1. By proper selection of component values, the current flowing through the emitter of PNP transistor 26 is sufficient to bring transistor 26 into saturation, thereby forcing its collector voltage to approach the positive rail voltage +V at 28. The collector 30 is connected to logic circuitry, shown representatively at 32, and couples a generated signal to the logic circuitry 32, which generated signal is active while the relay coil 24 is being released. Resistor R1 at 34 and capacitor C1 at 36 allow the signal on line 30 to remain active for a predetermined period after transistor 26 comes out of saturation as determined by the discharge of capacitor 36 through resistor 34. Resistor 34 has a value large enough to allow the transistor 26 to saturate. The capacitance of the capacitor 36 is limited by the amount of magnetic energy available in the relay coil 24, e.g. $LI^2$, and the energy required to charge the capacitor 36, e.g. $CV^2$. The transistor 26 thus eliminates the voltage spike associated with the inductive kick and provides a logic signal to be used while the contacts are bouncing to eliminate current and voltage on the contacts S1.

Figure 3:
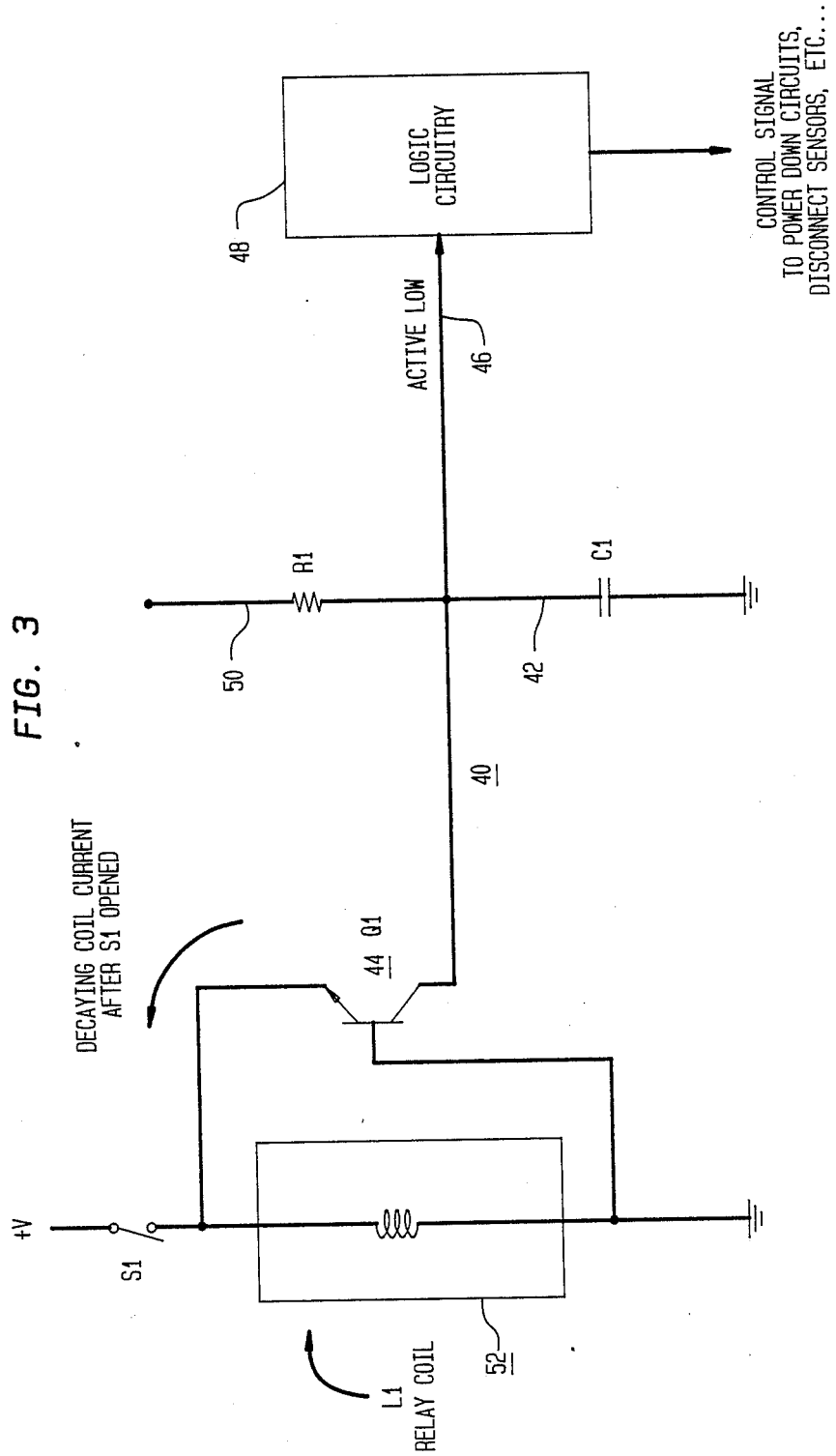
FIG. 3 is an alternative embodiment of a circuit implementing the present invention.

Referring now to FIG. 3, an alternative embodiment of the present invention is illustrated generally at 40, wherein the aforementioned limit on capacitance is not present. The circuit of FIG. 3 discharges capacitor 42 through an NPN transistor 44, thereby providing a negative active signal on line 46 to logic circuitry 48 with a delay time determined by the recharging of capacitor 42 through resistor 50. Since coil energy from coil 52 of the relay S1 coil L1 is used only as a trigger and is not required for charging capacitor 42, the capacitance can be increased and longer delay times achieved, thereby extending the predetermined period when the generated signal is active.

While the present invention is described in connection with preferred embodiments thereof, it is to be understood that additional embodiments, modifications, and applications will become apparent to those skilled in the art, and are included within the spirit and scope of the invention as set forth by the claims appended hereto.

I claim:

1. A circuit for reducing the inductive electrical surge of a releasing relay having switch contacts and a relay coil connected to a voltage source, and for generating a logic signal which is usable for controlling another circuit while said relay is being released comprising:
   transistor circuit means coupled in parallel to said relay coil to dissipate coil energy stored in said relay coil when the voltage source across said relay coil is removed;
   means, including proper selection of component values for said relay and said transistor circuit means, for bringing said transistor circuit means into saturation by a decaying coil current from said relay coil when it is released such that said transistor circuit means generates an output signal at a desired voltage level;
   means for maintaining said generated output signal at said desired voltage level for a predetermined time period after said transistor circuit means comes out of saturation;
   logic circuitry for providing a logic signal in response to input of a signal from said transistor circuit means; and
   means for coupling said generated output signal to said logic circuitry for said predetermined time period, such that said generated output signal is active and provided to said logic circuitry while said relay coil is being released.

2. A circuit in accordance with claim 1 wherein said transistor circuit means is a PNP transistor.

3. A circuit in accordance with claim 2 wherein said generated output signal is approximately equal to the voltage source applied to said relay coil.

4. A circuit in accordance with claim 1 wherein said logic signal is coupled as a control signal to power down circuitry supplying said relay contacts to enable dry switching of said relay.

5. A circuit in accordance with claim 1 wherein said logic signal is coupled as a control signal to disable sensors.

6. A circuit in accordance with claim 1 wherein said logic signal is coupled as a control signal to a telephone line circuit to disable the telephone hook switch detector.

7. A circuit in accordance with claim 1 wherein said logic signal is coupled as a control signal to a telephone line circuit to power down a battery feed circuit feeding a subscriber line.

8. A circuit in accordance with claim 1 wherein said means for maintaining said generated output signal at said desired voltage level comprises:
   an RC circuit having a resistor means and a capacitor means, whereby the value of said resistor means is large enough to cause said transistor circuit means to saturate, and wherein the time constant of said RC circuit is correspondingly related to said predetermined time period.

9. A circuit in accordance with claim 8 wherein the dissipation of inductive energy through said transistor circuit means substantially eliminates the voltage spike associated with said relay coil discharge, and said output signal is active for a time period corresponding to contact bounce such that said logic signal is a control signal for eliminating current and voltage on said switch contact.

10. A circuit for using the relay coil energy of a releasing relay having switch contacts and a relay coil connected to a voltage source to generate a signal which is active while said relay is being released, comprising:
    an active transistor circuit coupled in parallel to said relay coil;
    RC circuit means coupled to said active transistor circuit such that releasing of said relay and deenergization of said relay coil causes a capacitor of said RC circuit means to discharge through said active transistor circuit and causing at an output of said transistor circuit an active signal having a time delay determined by the recharging of said capacitor through a resistor of said RC circuit; and
    means coupling said active signal to logic circuitry for deriving a logic signal having a time duration corresponding to said time delay of said RC circuit.

11. A circuit in accordance with claim 10 wherein said active transistor circuit includes an NPN transistor having a negative active signal, whereby the coil energy of said relay coil is used as a trigger, and said capacitance is charged from a voltage source, thereby providing for increased capacitance size and correspondingly increased delay time.

* * * * *